United States Patent
Barlow et al.

[15] 3,688,952
[45] Sept. 5, 1972

[54] SPREADER

[72] Inventors: Conrad R. Barlow, Redondo Beach; Alexander H. B. Fergusson, Rialto, both of Calif.

[73] Assignee: Transland Aircraft, Inc., Harbor City, Calif.

[22] Filed: March 20, 1970

[21] Appl. No.: 21,365

[52] U.S. Cl. ................222/333, 239/171, 244/136
[51] Int. Cl. .............................................B64d 1/18
[58] Field of Search ........239/171; 222/333, 76, 251, 222/310; 244/136; 213/1.3; 280/422; 123/102, 103 E

[56] References Cited

UNITED STATES PATENTS

| | | | |
|---|---|---|---|
| 3,512,721 | 5/1970 | Barlow et al. | 239/171 X |
| 3,428,276 | 2/1969 | Hubbard | 239/171 X |
| 3,463,398 | 8/1969 | Smith et al. | 239/171 |
| 2,751,089 | 6/1956 | Scharfenberg | 213/1.3 |
| 1,931,752 | 10/1933 | Connors | 280/422 |

*Primary Examiner*—Robert B. Reeves
*Assistant Examiner*—Thomas E. Kocovsky
*Attorney*—Smyth, Roston & Pavitt

[57] ABSTRACT

An apparatus for spreading flowable material and attachable to a hovering airborne vehicle including a container for containing the material and first means for controlling the flow of material from the container. First and second connector members are carried by the airborne vehicle and the container, respectively, to releasably connect the container to the airborne vehicle. An electrical control circuit controls the first means with a first portion of the control circuit being carried by the airborne vehicle and a second portion of the control circuit being carried by the container. The portions of the control circuit are automatically electrically connected to thereby permit the operator of the airborne vehicle to control the operation of the spreader.

7 Claims, 6 Drawing Figures

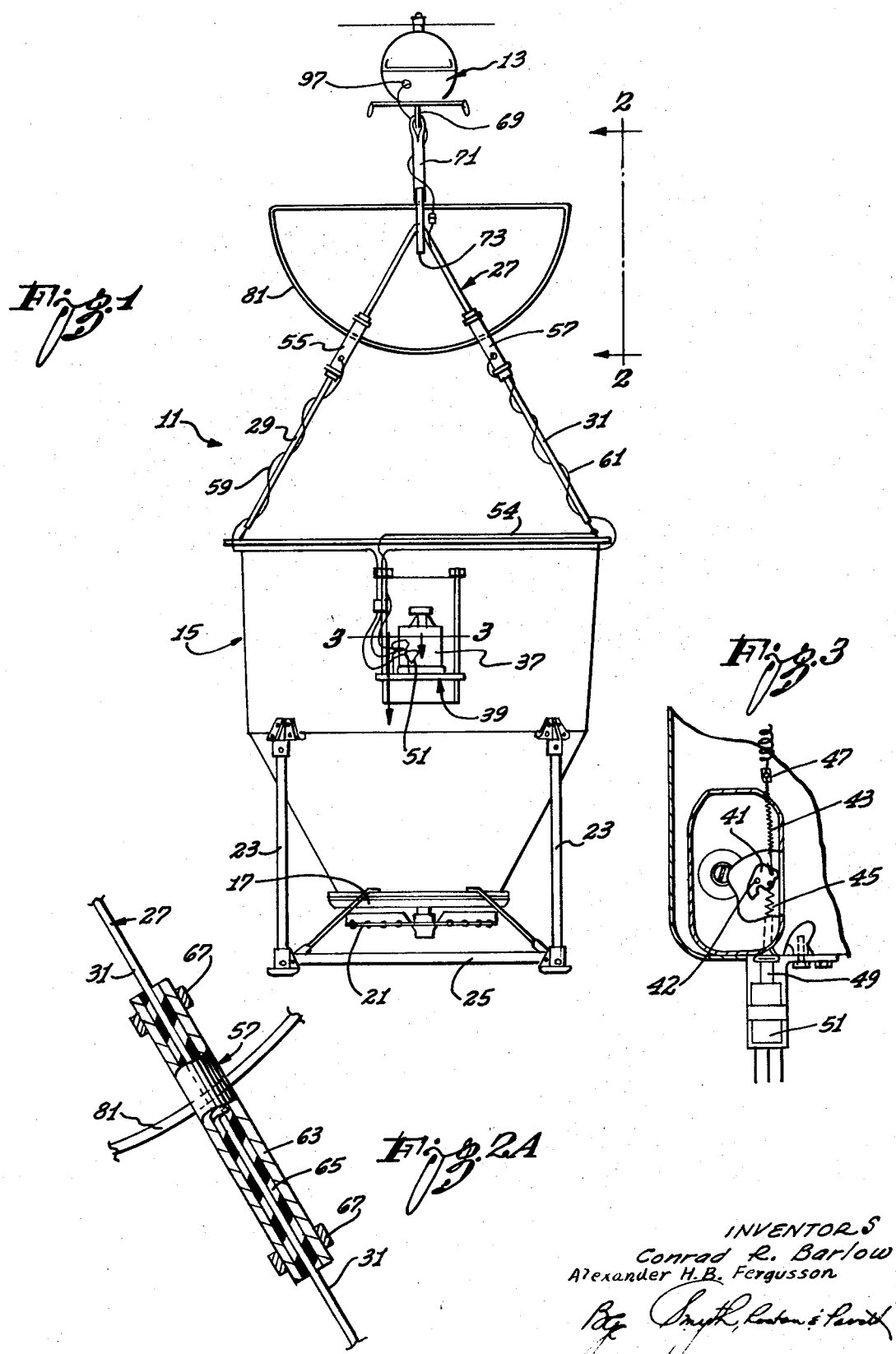

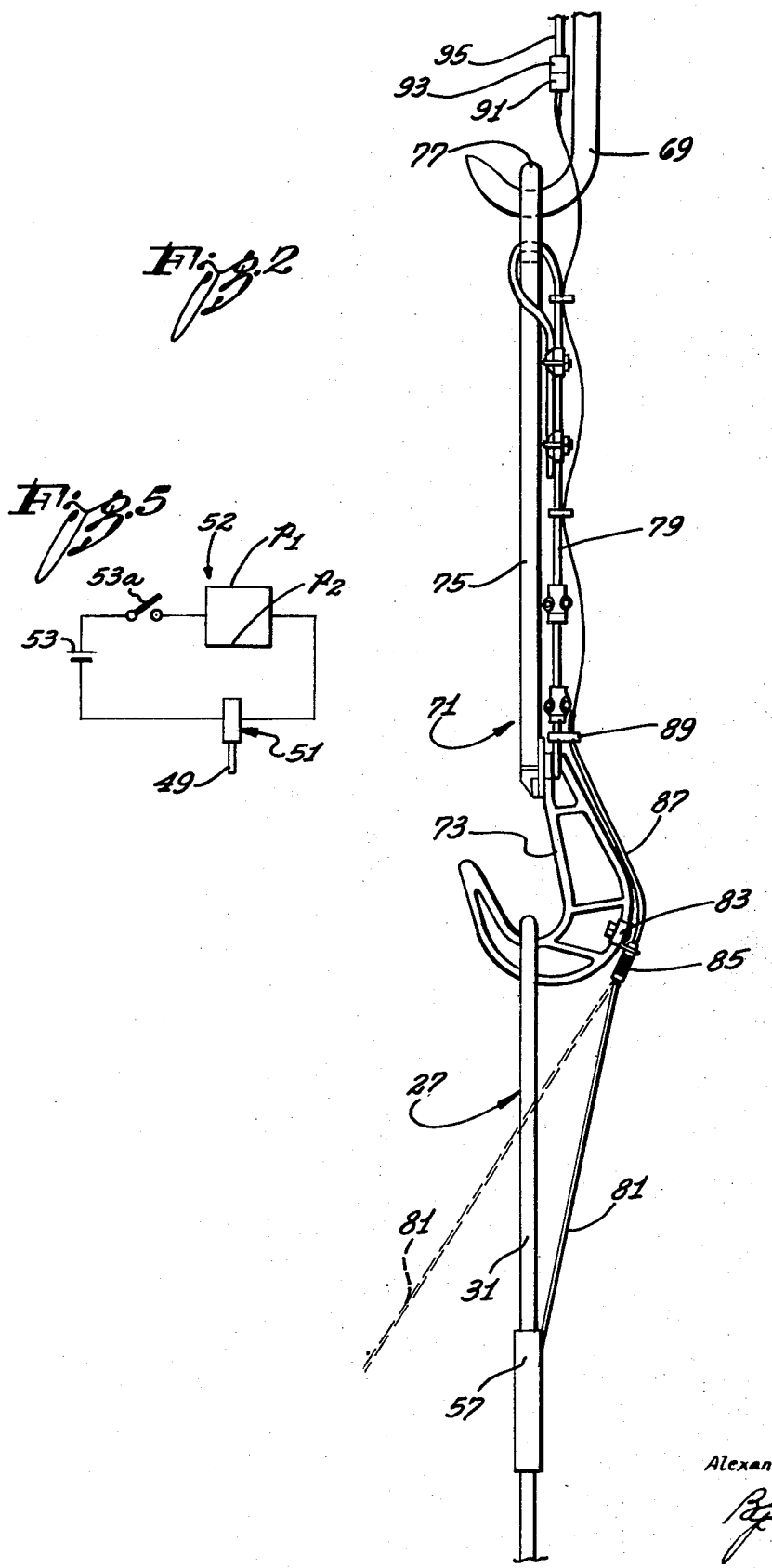

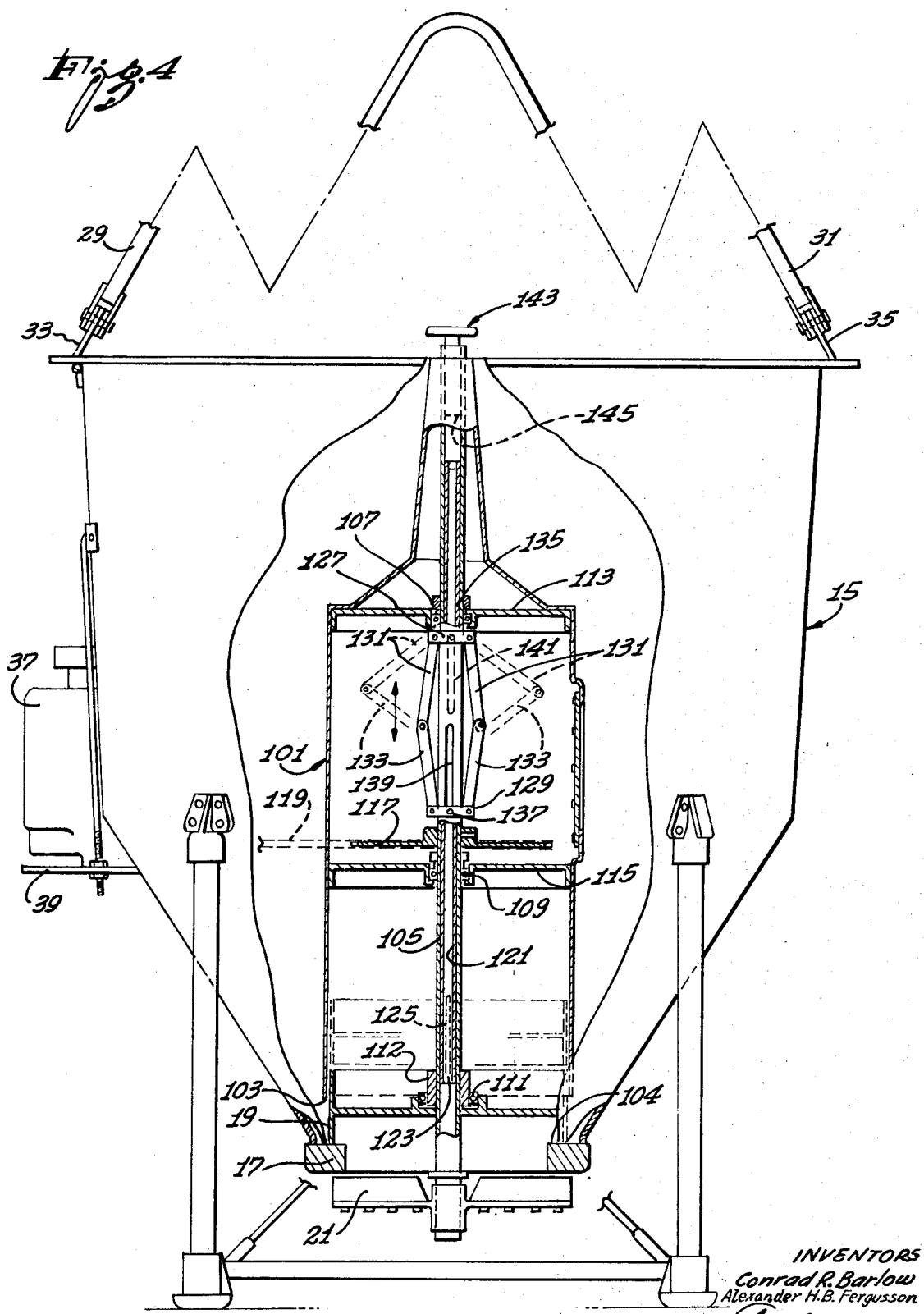

SPREADER

BACKGROUND OF THE INVENTION

This invention relates to a spreader which can be carried by an airborne vehicle to spread flowable material such as fertilizer, insecticides, etc. Spreaders of this general type are releasably attachable to a hovering type of airborne vehicle such as a helicopter.

Spreaders of this type typically include a container for containing the flowable material and suitable means such as a valve for controlling flow of material from the container and/or a spreader for spreading the material. The container may be a free-standing unit.

To pick up the spreader, the helicopter hovers overhead while the necessary mechanical and control connections are made. The control connections enable the operator of the airborne vehicle to control the operation of the spreader. It is desirable that these connections be made as rapidly as possible to minimize pickup time and to minimize danger to the workmen who must be beneath the hovering vehicle.

The most troublesome problem is making the control connections. In some prior art devices, the control connections between the spreader and helicopter are hydraulic and these connections take a substantial period of time to make. Common assignee's copending application, Ser. No. 701,342 now U.S. Pat. No. 3,512,721 proposes the use of radio controls in which a radio transmitter operable by the pilot of the helicopter controls the operation of the spreader. This system is quite successful as no physical control connections must be made between the helicopter and the spreader; however, its application is limited to regions which have no problems with interference with the radio signal utilized to control the spreader.

SUMMARY OF THE INVENTION

The present invention provides a spreader which can be rapidly connected to a hovering helicopter and which eliminates any problems experienced heretofore with the interference of radio signals. The mechanical and control connections are made automatically without the assistance of a workman beneath the hovering helicopter. The controls are preferably entirely electric thereby eliminating weight and complexity which are inherent in the use of hydraulic controls.

With the present invention, quick connect means rapidly mechanically and electrically connect the spreader to the helicopter. The mechanical connection can be accomplished, for example, with cooperating connector members on the helicopter and spreader, respectively. These connector members may be hook-like members to thereby facilitate their automatic locking engagement and automatic disengagement without the assistance of a workman beneath the hovering vehicle. In the pickup operation, the connector members are advanced toward each other and ultimately engaged and the airborne vehicle then carries the spreader aloft.

Preferably the electrical connections are made automatically during at least a portion of the pickup operation. With the present invention the electrical connections are made automatically without the assistance of a workman beneath the helicopter and without having to maneuver the helicopter in any special way other than as may be necessary to accomplish the mechanical connections.

This advantageous result can be accomplished, for example, by providing a first portion of the electrical control circuit on the helicopter and a second portion of the electrical control circuit on the spreader. The connector members themselves can be conductive and form part of the control circuit so that engagement of the connector members completes one conductive path between the helicopter and spreader.

A second conductive path between the helicopter and spreader can advantageously be formed by cooperating terminals which are positioned to engage as the connector members are relatively advanced toward each other. These terminals can be biased together so as to maintain contact during flight. Preferably the terminals are automatically disengaged as the connector members are disengaged and moved away from each other.

To assure that the terminals will remain biased together during normal relative movement between the spreader and helicopter during flight, the terminal carried by the helicopter forms a portion of a relatively long member such as a rod so that relative movement of the spreader relative to the helicopter in the direction of the rod will not cause disengagement of the terminals. To account for twisting movement of the spreader about the axis thereof relative to the helicopter, it is preferred to have a pair of radially spaced terminals carried by the container and engageable with the rod. To account for swinging movement of the container away from the rod, the rod is preferably spring biased toward the terminals. In this manner, the normal motions encountered during flight are adequately accounted for.

The electrical circuit thus formed permits the helicopter pilot to control the operation of the spreader with a switch or other appropriate electrical control member within the helicopter. The features of this invention relating to the electrical connections between the helicopter and spreader can, of course, be used with many different kinds of spreaders and many different control mechanisms. Preferably, however, to reduce complexity and weight, the controls of the spreader are entirely electrical. In a preferred form of the present invention, the container includes a valve for preventing or allowing flow of the material out of the container and spreader means for impelling or spreading the material which exits from the container. To further reduce weight, cost and complexity of the system, both the valve and spreader are preferably operated by a single motor which is controlled by the electrical control system. Specifically, the motor may be an internal combustion engine, the speed of which may be increased by a solenoid which is energized by the control circuit and the increase in motor speed may cause opening of the valve and driving of the spreader means at the desired rate.

Another feature of this invention is the use of a flexible drive connection between the solenoid and the throttle. This prevents burning out of the solenoid as a result of the driving connection between the throttle and solenoid becoming locked.

The invention, both as to its organization and method of operation together with further features and advantages thereof, may best be understood by reference to the following description taken in connection with the accompanying illustrative drawings.

BRIEF DESCRIPTION OF THE DRAWINGS

FIG. 1 is a front elevational view of a spreader constructed in accordance with the teachings of this invention suspended from a helicopter with the helicopter being illustrated on a greatly reduced scale.

FIG. 2 is a fragmentary side elevational view partly in section of the means for electrically and mechanically connecting the spreader to the helicopter taken generally along line 2—2 of FIG. 1.

FIG. 2a is an enlarged fragmentary view partially in section of a preferred form of a terminal carried by the container.

FIG. 3 is an enlarged fragmentary sectional view taken generally along line 3—3 of FIG. 1 and showing a preferred manner of controlling throttle position of the engine.

FIG. 4 is a front elevational view partially in section showing a preferred form of spreader.

FIG. 5 is a diagrammatic view of a control circuit for the spreader.

DESCRIPTION OF THE PREFERRED EMBODIMENT

Referring to FIG. 1 of the drawings, a spreader 11 constructed in accordance with the teachings of this invention is shown releasably attached to a helicopter 13. The spreader 11 includes a container 15 having a bottom opening 17 through which flowable material within the container 15 can be discharged. Flow of material through the opening 17 can be controlled by a valve element 19 (FIG. 4). Spreader means in the form of a rotatable impeller 21 (FIGS. 1 and 4) is positioned beneath the opening 17 so that it can receive material flowing through the opening and spread it radially outwardly from the opening.

The container 15 is supported by a plurality of generally vertical legs 23 which support the container above a suitable supporting surface (not shown). Preferably the legs 23 extend downwardly sufficiently so that the legs support the impeller 21 above the supporting surface. The legs 23 are attached to the container 15 in any suitable manner and braces 25 may extend between the legs 23 to provide added rigidity.

A bail 27 is suitably attached to the upper end of the container 15 and projects upwardly therefrom. In the embodiment illustrated, the bail 27 is generally in the form of an inverted V and includes leg portions 29 and 31 joined at the upper ends thereof. As shown in FIG. 4, the container 15 may be provided with upwardly projecting tabs 33 and 35 and the lower ends of the leg portions 29 and 31 may be suitably affixed to these tabs.

A variable speed internal combustion engine 37 is mounted by a suitable support 39 on the container 15. The engine 37 has a throttle (not shown), the position of which is controlled in a conventional manner by a throttle control member 41 (FIG. 3). The control member 41 is suitably mounted for pivotal movement about an axis 42 normally maintained in the low speed condition shown in FIG. 3 by springs 43 and 45 which are attached to the control member. The other end of the spring 43 is suitably attached to a fixed support 47, and the other end of the spring 45 is suitably attached to a movable actuator member 49 of an electric motor or actuator such as a solenoid 51.

To accelerate the engine to a relatively fast speed, the solenoid 51 is energized by a control circuit 52 shown in FIG. 5 to thereby move the actuator member 49 downwardly as viewed in FIG. 3. This causes clockwise pivotal movement of the control member 41 against the baising force of the spring 43 and consequent movement of the throttle (not shown) to accelerate the engine 37. When the solenoid 51 is deenergized, the spring 43 returns the control member 41 to the neutral position shown in FIG. 3.

It is important that the actuator member 49 be drawn to the fully energized position when the solenoid 51 is actuated. If movement of the actuator member 49 is stopped before the fully energized position thereof is reached, the solenoid 51 may burn out. If the control member 41 were to become frozen in the position shown in FIG. 3 for any reason and if a solid link interconnected the control member 41 and the actuator member 49, then the actuator member could not move to the fully energized position. With the present invention, however, the spring 45 forms a flexible drive element linking the actuator member 49 and the control member 41. Accordingly, if for any reason the control member 41 should become locked in the position shown in FIG. 3, the actuator 49 could move to the fully energized position when the solenoid 51 is energized by expanding the spring 45 to thereby prevent burning out of the solenoid.

Energization of the solenoid 51 is controlled by the control circuit 52 (FIG. 5), a portion of which is carried by the container 15 and another portion of which is carried by the helicopter 13. Generally the circuit 52 includes a source of electrical energy such as a battery 53 and a pilot operated switch 53a both of which are carried by the helicopter 13 and appropriate conductors for connecting the battery and the switch to the solenoid 51. Such conductors provide parallel paths p1 and p2 leading to the solenoid 51.

The portion of the control circuit 52 carried by the container 15 includes a conductor 54 (FIG. 1) which extends from the solenoid 51 to the leg portion 31 of the bail 27. The conductor 53 is suitably electrically connected to the leg portion 31 adjacent the lower end thereof. The bail 27 is constructed of a conductive metal so that the bail forms a portion of the control circuit of the container.

The bail 27 has terminals 55 and 57 mounted on corresponding regions of the leg portions 29 and 31, respectively. Conductors 59 and 61 extend from the solenoid 51 to the terminals 55 and 57, respectively. Of course, the conductors 54, 59 and 61 can be run in any desired manner to their respective destinations and can be suitably clamped at various regions along their lengths, if desired.

Although the terminals 55 and 57 can be of various constructions, they must be electrically insulated from the bail 27 or from the conductive portions thereof, and they are preferably of relatively substantial size to facilitate contact with cooperative terminals carried by the helicopter 13 which are described hereinbelow.

A preferred, but illustrative, form of terminal is shown in FIG. 2a. FIG. 2a shows the terminal 57, it being understood that the terminal 55 is identical therewith. The terminal 57 includes a conductive sleeve 63 and an insulating jacket 65 within the sleeve for insulating the sleeve from the leg portion 31. The sleeve 63 in the embodiment illustrated is held in position on the leg portion 31 by a pair of clamps 67. The conductor 61 is electrically connected to the sleeve 63 in any suitable manner.

FIGS. 1 and 2 best illustrate the portion of the apparatus normally carried by the helicopter 13. The helicopter 13 has a cargo hook 69, and a pickup element 71 which terminates downwardly in a hook 73 and is releasably connected to the cargo hook 69. The hook 73 is adapted to interengage with the upper end of the bail 27 as shown in FIGS. 1 and 2 to thereby releasably mount the container 15 thereon.

More specifically with the reference to FIG. 2, the pickup element 71 includes a rigid shank 75 which terminate upwardly in an eye 77 which releasably receives the cargo hook 69. A safety cable 79 is looped through the eye 77 and is tied at the lower end of the hook 73. The cable 79 is sufficiently strong to hold the container 15 aloft should the shank 75 break during flight.

A rod 81 in the form of a loop is attached by a bracket 83 to the hook 73. The rod 81 is preferably made of spring steel such as a stainless steel and it projects downwardly to form, for example, a 60° angle with the horizontal when it is unrestrained as shown by the dashed lines in FIG. 2. When the hook 73 engages the bail 27 as shown in FIGS. 1 and 2, the rod 81 is resiliently deflected to the position shown in full lines in FIG. 2. In this position, the rod 81 engages the terminals 55 and 57. A connector 85 suitably electrically connects the rod 81 and a conductor 87 which is clamped to the shank 75 by a plurality of clamps 89. The conductor 87 projects upwardly toward the helicopter 13 and terminates in a plug 91 which is received within a socket 93. Another conductor 95 leads from the socket 93 to the switch 53a (FIG. 5) which is within the helicopter 13 and accessible to the operator thereof. The plug 91 and socket 93 are automatically separable in response to a pulling force so that if the container 15 is jettisoned the plug 91 will readily separate from the socket 93.

The portion of the control circuit carried by the helicopter 13 includes the pickup element 71 and the cargo hook 69 both of which are electrically conductive metal members. The cargo hook 69 is suitably connected to the frame of the helicopter 13. Another portion of the control circuit carried by the helicopter includes the rod 81, the conductors 87 and 95, the plug 91 and the socket 93.

With the container 15 filled with flowable material such as insecticide, fertilizer, etc. the helicopter 13 is slowly moved toward the bail 27 at an appropriate elevation so as to connect the hook 73 to the bail. The hook 73 is moved toward the upper end of the bail 27 with the hook 73 being slightly beneath the upper end of the bail. Ultimately, the rod 81 engages the terminals 55 and 57, and thereafter the hook 73 is moved into interlocking engagement with the upper end of the bail. Such movement of the hook 73 resiliently deforms the rod 81. The helicopter can then carry the container 15 aloft.

With the container 15 suspended by the helicopter 13, path p1 (FIG. 5) to the solenoid 51 is provided by the conductor 59, the terminal 55 and a portion of the rod 81 and the path p2 is provided by the conductor 61, the terminal 57 and a portion of the rod 81. The conductive rod 81 engages the terminals 55 and 57 to thereby electrically connect these terminals to the switch 53a. A second conductive path between the battery 53 and the solenoid 51 is provided by the conductor 54, the bail 27, the pickup element 71 and the cargo hook 69. This latter path may be to ground with the hot lead being through the rod 81. As the rod 81 engages the terminals 55 and 57, it may be considered to provide an elongated terminal.

During flight, the container 15 will move somewhat relative to the helicopter 13. Should such movement be to the left or right as viewed in FIG. 2, the rod 81 will, because of its resilience, maintain engagement with the terminals 55 and 57. Should the container 15 rotate slightly about its vertical axis relative to the helicopter, one of the terminals 55 and 57 will maintain its engagement with the rod 81. Thus, the electrical circuit will not be broken due to normal relative movement between the container 15 and the helicopter 13.

To disconnect the helicopter 13 and the container 15, the helicopter is lowered to drop the hook 73 beneath the upper end of the bail 27. The resilient rod then tends to bias the hook 73 horizontally away from the bail 27. In any event appropriate horizontal movement of the helicopter fully separates the hook 73 and the bail 27.

With the control circuit 52 having been established between the helicopter 13 and the container 15, any suitable means may be provided on the container 15 which is responsive to actuation of the switch 53a for controlling the material spreading function. In the embodiment illustrated, closing of the switch 53a energizes the solenoid 51 to increase the speed of the engine 37. Means responsive to such increased engine speed for controlling the material distribution function is illustrated by way of example in FIG. 4. The construction shown in FIG. 4 is substantially similar to that shown in common assignee's copending application, Ser. No. 701,342.

A housing 101 is mounted within the container 15 (FIG. 4) by suitable brackets (not shown) extending radially outwardly from the housing and being connected to the wall of the container. The housing 101 has a lower end 103 which is spaced upwardly from the opening 17 to provide a space through which the flowable material can flow en route to the opening 17.

The valve element 19 is generally tubular and is telescoped within the lower end portion of the housing 101. With the engine 37 being operated at low speed, the valve element 19 is in a lowermost or closed position shown in full lines in FIG. 4 in which it engages an annular valve seat 104 to thereby block off the entrance to the opening 17.

A vertical tubular drive shaft 105 is mounted within the housing 101 for rotation by an upper bearing 107, an intermediate bearing 109, a lower bearing 111 and a sleeve 112. The upper and intermediate bearings 107 and 109 are in turn supported by bearing supports 113 and 115, respectively, which are mounted on the housing 103, and the lower bearing 111 is supported by the valve element 19. The sleeve 112 is connected to the bearing 111 and the shaft 105 to permit the shaft 105 to rotate without rotating the valve element. The sleeve 112 is connected to the bearing 111 and the shaft 105 to permit the shaft 105 to rotate without rotating the valve element. The sleeve 112 slidably receives the drive shaft 105 to thereby permit relative axial movement therebetween. The drive shaft 105 is rotated in any suitable manner such as by a sprocket 117 mounted thereon and a drive chain 119 suitably drivingly connected to the engine 37 and to the sprocket 117. The impeller 21 is suitably mounted on the lower end of the drive shaft 105 for rotation therewith.

The drive shaft 105 is hollow and an operating rod 121 is mounted within the drive shaft for rotation with the drive shaft and for axial sliding movement relative to the drive shaft. The operating rod 121 is connected by a pin 123 at its lower end to the valve element 19 whereby axial movement of the operating rod 121 causes corresponding axial movement of the valve element 19 to thereby open and close the opening 17. To accommodate the relative axial movement between the drive shaft 105 and the operating rod 121, the drive shaft 105 has an elongated axial slot 125 through which the pin 123 projects.

A fixed collar 127 is suitably fixedly mounted on the drive shaft 105 and a movable collar 129 is mounted on the drive shaft 105 for axial sliding movement relative thereto. The collars 127 and 129 are interconnected by flyweights in the form of upper links 131 and lower links 133. The upper links are pivotally connected to the collar 127 and the lower links are pivotally connected to the collar 129. Confronting end portions of the links 131 and 133 are interconnected as shown in FIG. 4. Accordingly, by rotating of the drive shaft 105 at a predetermined angular velocity, the links 131 and 133 can be caused to move to the position shown in dashed lines in FIG. 4 in which the movable collar 129 is moved upwardly.

Pins 135 and 137 connect the collars 127 and 129, respectively, to the operating rod 121 to thereby cause rotation of the operating rod with the drive shaft 105. The pin 137 projects through an axial slot 139 in the drive shaft 105, and this slot permits relative axial movement between the pin 137 and the drive shaft. The pin 135 projects through an elongated slot 141 in the operating rod 121, and this slot permits relative axial movement between the pin 135 and the operating rod.

To limit the upward travel of the operating rod 121 and hence the amount which the valve element 19 can open, a movable stop 143 is mounted in the upper end of the drive shaft 105. In the embodiment illustrated, the movable stop is in the form of a screw adjustably received in the drive shaft 105 and terminating downwardly in an abutment 145 which serves to engage the upper end of the operating rod 121 and prevent further upward movement thereof. By adjusting the position of the abutment 145, the maximum opening of the valve element 19 can be controlled.

In operation of the portion of the spreader shown in FIG. 4, the engine 37 is preferably started prior to hook up of the spreader 11 on the helicopter 13. With the engine 37 idling, the drive shaft 105 is driven by the chain 119 and the sprocket 117, and the operating rod 121 is rotated by the pins 123, 135 and 137. However, at the idle spped of the engine 37, the flyweights 131 are not rotated at sufficient angular velocity to produce adequate centrifugal force to elevate the valve element 19.

When the solenoid 51 is energized to increase the speed of the engine 37 as described hereinabove, the flyweights 131 rotate at sufficient speed to produce sufficient centrifugal force to cause them to move to the position shown in dashed lines in FIG. 4. As such movement takes place, the pin 137 is elevated with the movable collar 129 to thereby elevate the operating rod 121. The pin 135 does not prevent such upward movement of the operating rod 121 because of the presence of the slot 141 in the operating rod and the pins 123 and 137 do not prevent such upward movement because of the slots 125 and 139, respectively. Upward movement of the operating rod 121 causes the pin 123 to lift the sleeve 112 and the valve element 19 to expose the opening 17 an amount which is the function of engine speed and of the position of the abutment 145. Flowable material can then flow under the influence of gravity through the opening 17 and can be spread by the impeller 21.

Although an exemplary embodiment of the invention has been shown and described, many changes, modifications, and substitutions may be made by one having ordinary skill in the art without necessarily departing from the spirit and scope of this invention.

We claim:

1. An apparatus for spreading material and attachable to an airborne vehicle of the type capable of hovering comprising:

a container for containing the material, said container having an opening therein through which the material can flow;

spreader means carried by the container for spreading the material which flows through said opening;

motor means carried by said container for operating said spreader means, said motor means including a variable speed fuel burning engine having a throttle, a first speed and a second speed which is greater than said first speed;

valve means for preventing flow of material through said opening and responsive to said motor means attaining said second speed for opening to permit flow of material through said opening;

first and second connector members carried by the airborne vehicle and said container, respectively, said connector members being releasably engageable to permit the airborne vehicle to carry said container aloft;

an electrical control circuit for controlling said motor means, a first portion of the control circuit being carried by the airborne vehicle and a second portion of the control circuit being carried by said container;

quick connect means for electrically connecting the first and second portions of the control circuit;

said second portion of said control circuit including a solenoid and resilient drive means for drivingly connecting said solenoid and said throttle to thereby permit said solenoid to increase the speed of said motor from said first speed to said second speed; and said first portion of said control means including first means controllable by the operator of the airborne vehicle for controlling said solenoid.

2. An apparatus for spreading material and attachable to an airborne vehicle of the type capable of hovering comprising:

a container for containing the material, said container having an opening therein through which the material can flow;

first means on said container for causing the material to flow through said opening and for preventing flow of material through said opening;

a bail mounted on said container and projecting upwardly therefrom, said bail having a conductive portion;

a hook-like member carried by the airborne vehicle and being easily releasably engageable with said bail to permit the airborne vehicle to carry said container aloft, said hook-like member having a conductive portion engageable with the conductive portion of said bail when said hook-like member and said bail are releasably engaged to permit the airborne vehicle to carry the container aloft;

an electrical control member carried by the airborne vehicle and operable by the operator of the vehicle;

second means for providing a first electrically conductive path between said control member and said first means, said second means including spaced terminals carried by said bail and electrically insulated from said conductive portion of said bail, a conductor carried by the airborne vehicle and electrically insulated from said conductive portion of said hook-like member, said conductor being of sufficient length to span the gap between said terminals and means for resiliently biasing said conductor and said terminals into engagement when said hook-like member and said bail are engaged so as to permit the airborne vehicle to carry said container aloft; and third means for providing a second electrically conductive path between said control member and said first means, said third means including said conductive portions of said bail and said hook-like member whereby the engagement of said hook-like member and said bail complete said second conductive path and the completion of said second electrically conductive path permitting the operator of the vehicle to control said first means with said control member.

3. An apparatus as defined in claim 2 wherein said first terminal includes an electrically conductive sleeve mounted on said bail, said sleeve being separated from said bail by a layer of insulating material.

4. An apparatus as defined in claim 2 wherein said bail includes first and second portions extending upwardly, respectively, from generally opposite sides of said container, said bail including a reverse end portion interconnecting said first and second portions of said bail, said hook-like member engaging said reverse bend portion and said first and second terminals being mounted on said first and second portions, respectively, of said bail.

5. A distribution apparatus for flowable material, said apparatus being attachable to a vehicle capable of hovering and comprising:

distribution means for distributing flowable material;

cooperating means on the distribution means and the vehicle for attaching the distribution means to the vehicle to permit the vehicle to carry the distribution means aloft;

electrical control means for controlling the operation of the distribution means, said control means including first and second portions carried by the vehicle and the distribution means, respectively;

said control means including means responsive to the attachment of the distribution means by the cooperating means to the vehicle for operatively electrically connecting said first and second portions of said control means;

said first portion of said control means including means operable by the operator of the vehicle for causing said control means to operate said distribution means; and said distribution means including a container and said cooperating means including a bail carried by the container, said means for operatively connecting including conductive members carried by the vehicle and the bail, Respectively, and engageable in response to said attachment of the distribution means to the vehicle, said control means including an electrical circuit and said circuit including said conductive members.

6. An apparatus, as defined in claim 5 including means responsive to disconnecting the cooperating means for operatively disconnecting said first and second portions of said control means so that the operator can no longer operate the distribution means.

7. An apparatus as defined in claim 5 including resilient means for biasing said conductive members into engagement.

* * * * *